United States Patent [19]

Cecchini

[11] 4,026,636

[45] May 31, 1977

[54] STEREOSCOPIC FILMS

[76] Inventor: Giuliano Cecchini, via dell'Argin Grosso 105, Florence, Italy

[22] Filed: Sept. 10, 1975

[21] Appl. No.: 611,877

[30] Foreign Application Priority Data

Sept. 20, 1974 Italy ................................ 11678/74

[52] U.S. Cl. ................................ 350/135; 350/241
[51] Int. Cl.² ........................................ G02B 27/22
[58] Field of Search ............................ 350/135, 241

[56] References Cited

UNITED STATES PATENTS

| 1,796,432 | 3/1931 | Barlatier | 350/135 |
| 2,590,260 | 3/1952 | Mast et al. | 350/135 |
| 2,709,401 | 5/1955 | Jaros | 350/135 X |

FOREIGN PATENTS OR APPLICATIONS

| 1,289,330 | 2/1969 | Germany | 350/135 |

Primary Examiner—Edward S. Bauer
Assistant Examiner—Matthew W. Koren

Attorney, Agent, or Firm—Eugene J. Kalil; James M. Rhodes, Jr.

[57] ABSTRACT

A method of producing stereoscopic film from standard 35 mm film is described in which the standard 35 mm is longitudinally cut in half. Selected sprocket holes in each half are enlarged to provide a series of locating holes at regular intervals along the film. Each locating hole enables a corresponding pair of stereoscopic film frames on the film to be located in a viewing position. Also described is a viewer for viewing the stereoscopic films. The viewer incorporates a locating finger which engages each locating hole in turn to locate and hold the film steady while viewing. The viewer includes a reciprocating drive means for driving the film. The locating finger is withdrawn from a locating hole when the drive means performs its forward stroke and the forward stroke is limited when the finger engages the next hole. The finger remains engaged with the next locating hole during the return stroke of the drive means thereby preventing any inadvertent movement of the film during the return stroke.

3 Claims, 28 Drawing Figures

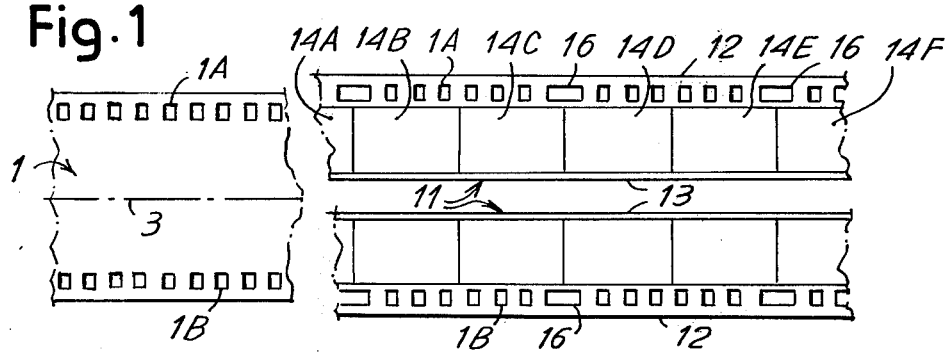
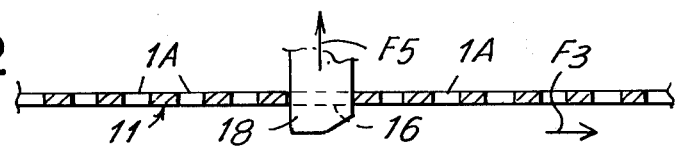
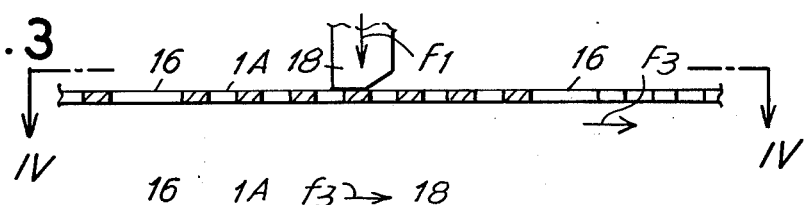
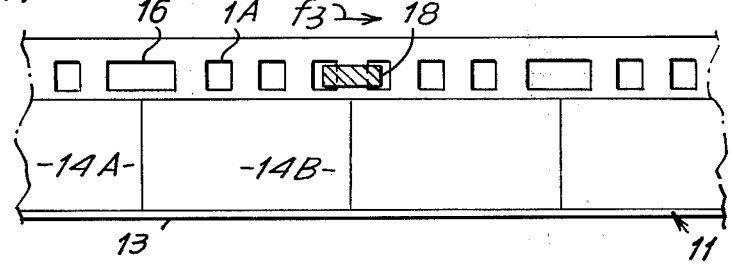
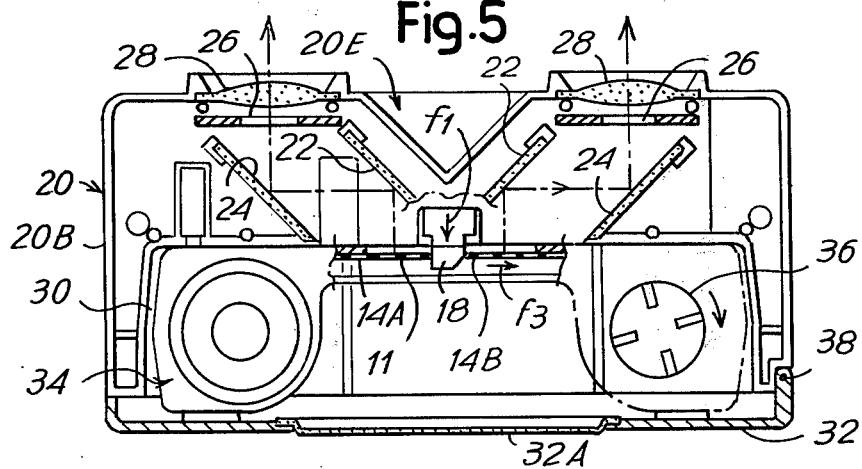

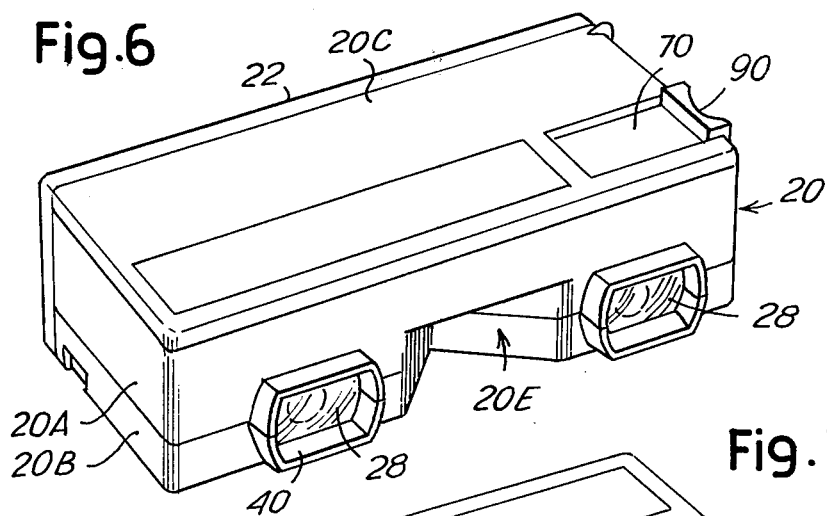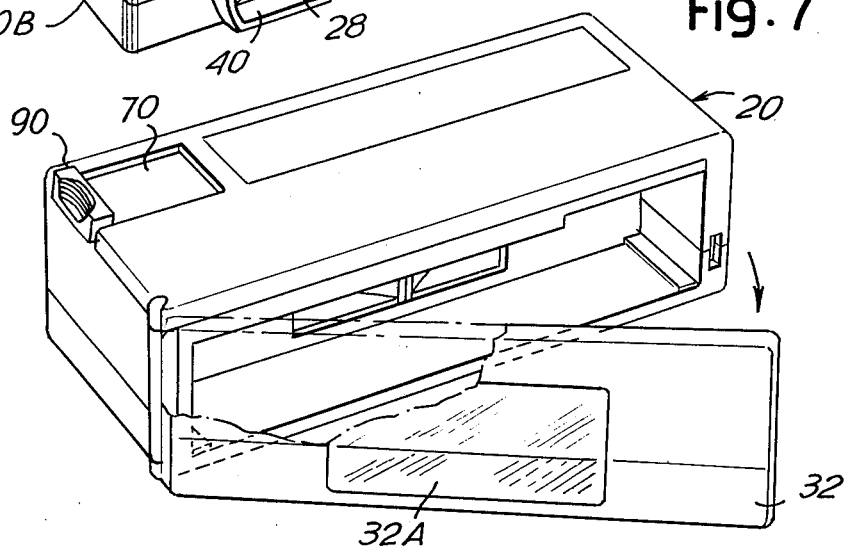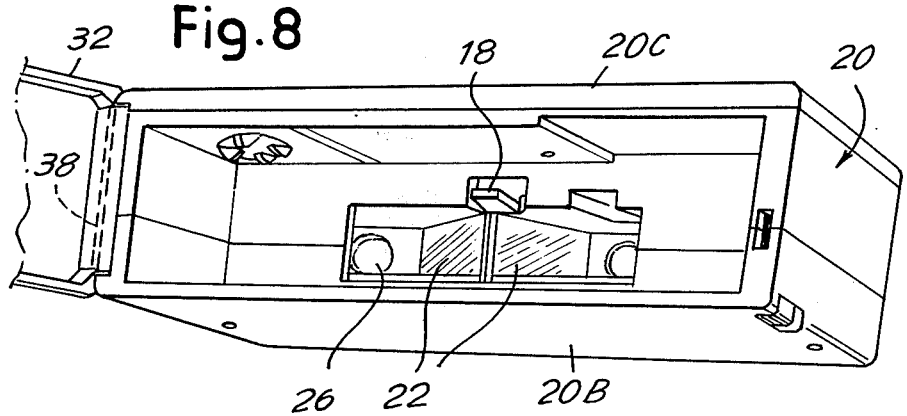

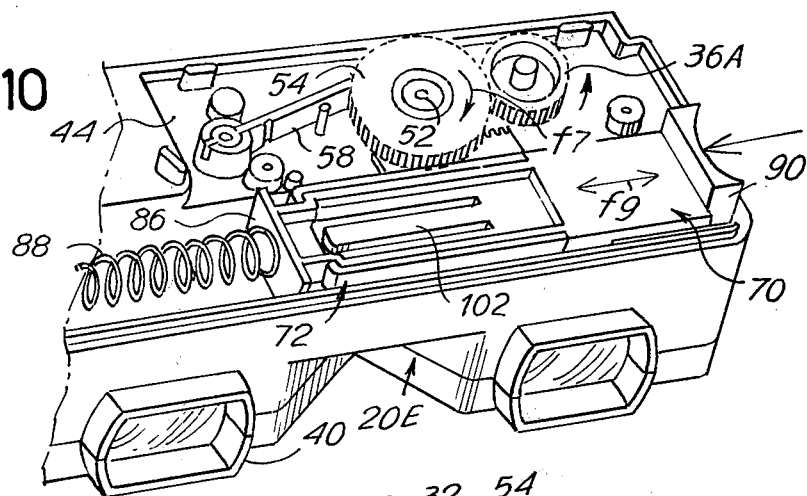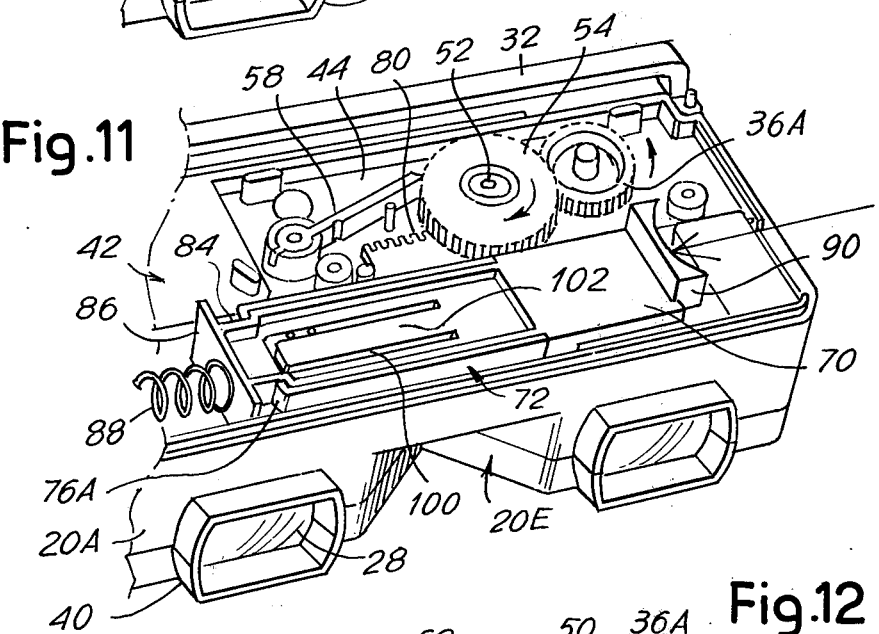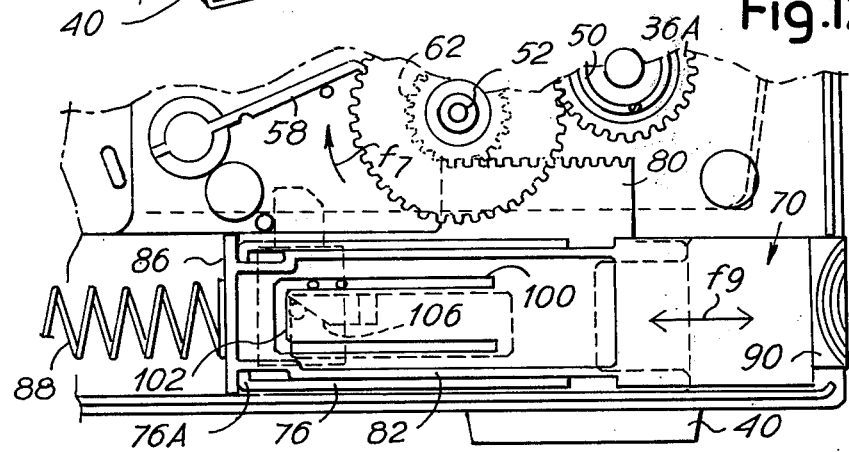

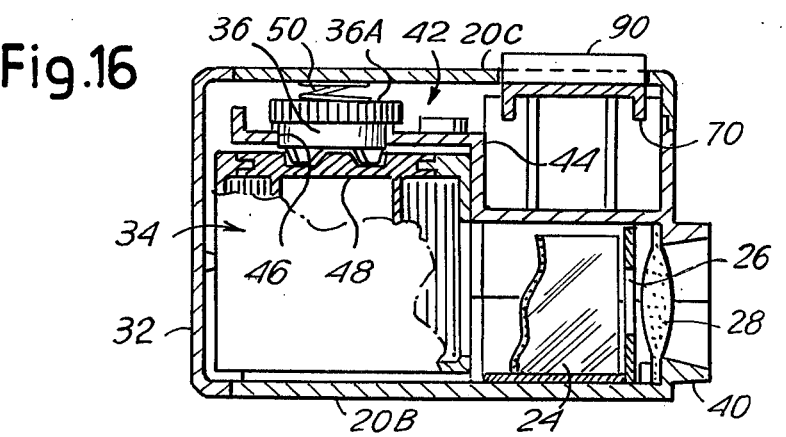
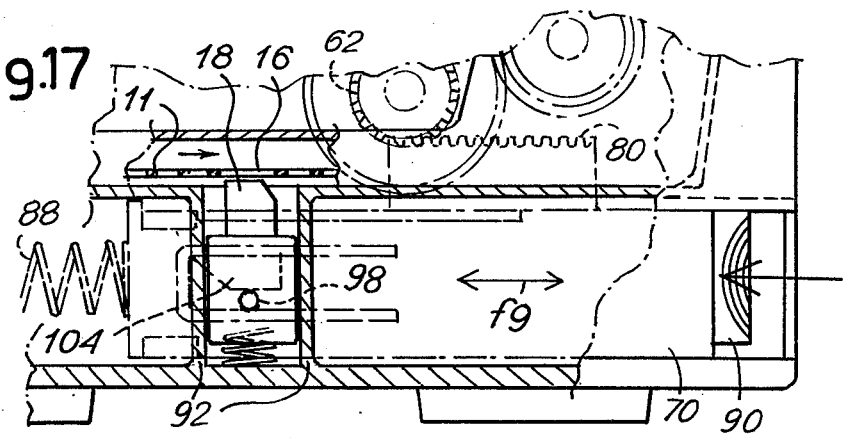
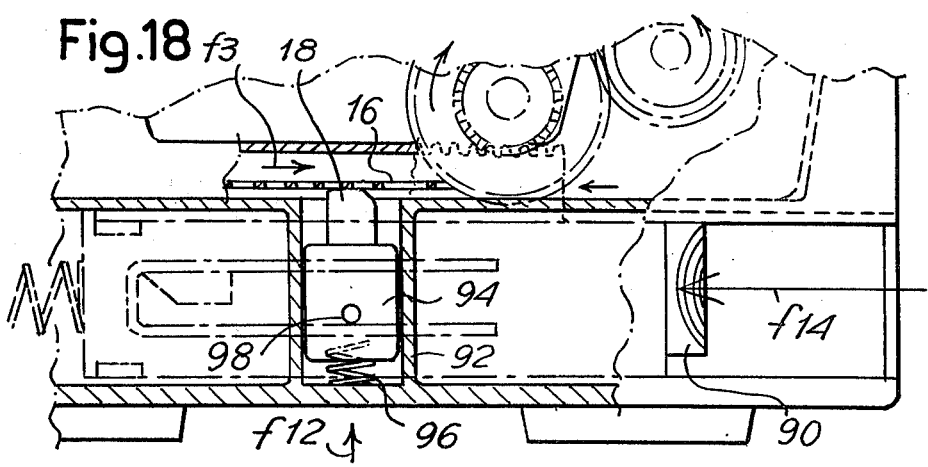

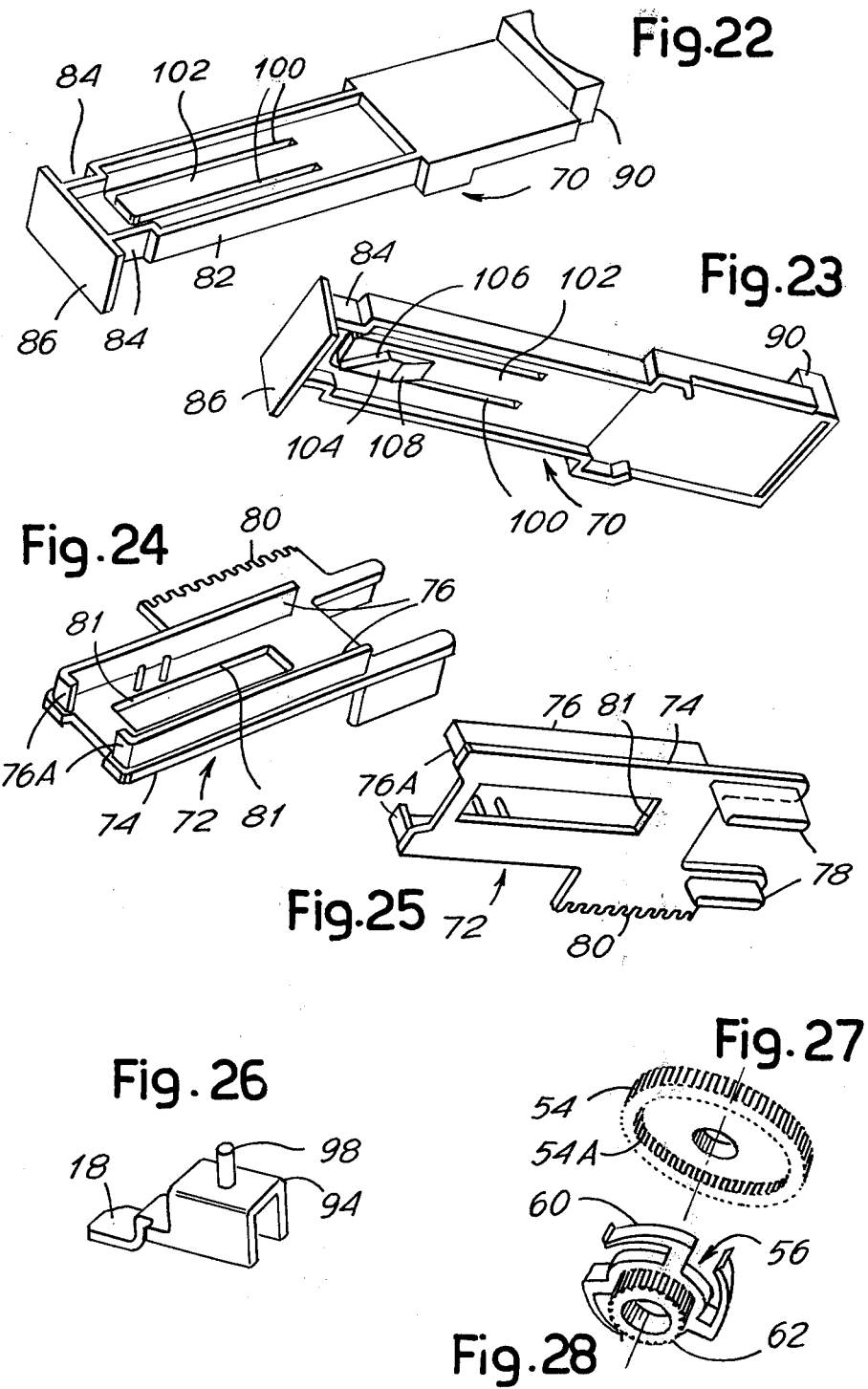

STEREOSCOPIC FILMS

BACKGROUND OF THE INVENTION

1. Field of the Invention

The present invention relates to web driving apparatus.

2. Description of the Prior Art 35 mm films have been used in stereophotography. With such films pairs of stereoscopic images are recorded side by side on the film with each pair of images taking up two standard frames of the film. Filmwise this makes stereophotography twice as expensive as monophotography.

It is an object of the invention to make stereophotography comparable in terms of cost of film, with monophotography.

Stereophotographic viewers are known which enable stereoscopic images to be viewed. Such viewers include reciprocating drive means for changing the picture being viewed. Such viewers suffer from the disadvantage that after the forward stroke to bring the film into the viewing position the film tends to be jerked by the drive means during the return stroke thus preventing an observer from a clear and steady-view of the stereoscopic images.

It is an object of the invention to hold the film steady during the return stroke of the drive means.

SUMMARY OF THE INVENTION

According to the invention there is provided a stereoscopic film viewer for viewing successive pairs of stereoscopic film images on corresponding pairs of frames in a length of film having a locating hole associated with each pair of frames to enable accurate location of the frames by the viewer, the viewer comprising drive means for driving the film past a viewing station, and locating means including a finger biased towards the film for engagement with successive said holes to locate and lock each pair of frames in turn in the viewing station, the drive means including a reciprocatable member having a resilient portion carrying a cam and the locating means including a cam follower arranged to coact with the cam in such a manner that during the forward stroke of the reciprocatable member, the finger is temporarily displaced out of a position in which it can engage a said locating hole until the drive means has started to drive the film, and that during the return stroke the cam follower acts to displace the cam out of a position in which it can act to displace the fingers.

BRIEF DESCRIPTION OF THE DRAWINGS

A stereoscopic film viewer embodying the invention will now be described by way of example with reference to the accompanying diagrammatic drawings in which:

FIG. 1 is a plan view of a strip of photographic film before and after cutting;

FIGS. 2 and 3 are longitudinal sections through the film of FIG. 1 in which the film is respectively located by and passing a locating finger of the viewer;

FIG. 4 is a section taken on the line IV—IV of FIG. 3;

FIG. 5 is a part cut away plan view of the viewer;

FIGS. 6, 7 and 8 are different perspective view of the viewer with a cover of the viewer in different degrees of opening;

FIGS. 10 and 11 are fragmentary perspective views of the viewer in two different states of operation;

FIGS. 12 and 13 are part cut away plans of the viewer of FIG. 10;

FIGS. 15 and 16 are sections taken on lines XV—XV and XVI—XVI of FIG. 14;

FIGS. 17, 18 and 19 are sections similar to that of FIG. 14 with the viewer in three different operational states;

FIGS. 22 to 28 are perspective views of different components of the viewer.

DESCRIPTION OF THE PREFERRED EMBODIMENT

Figure 9:
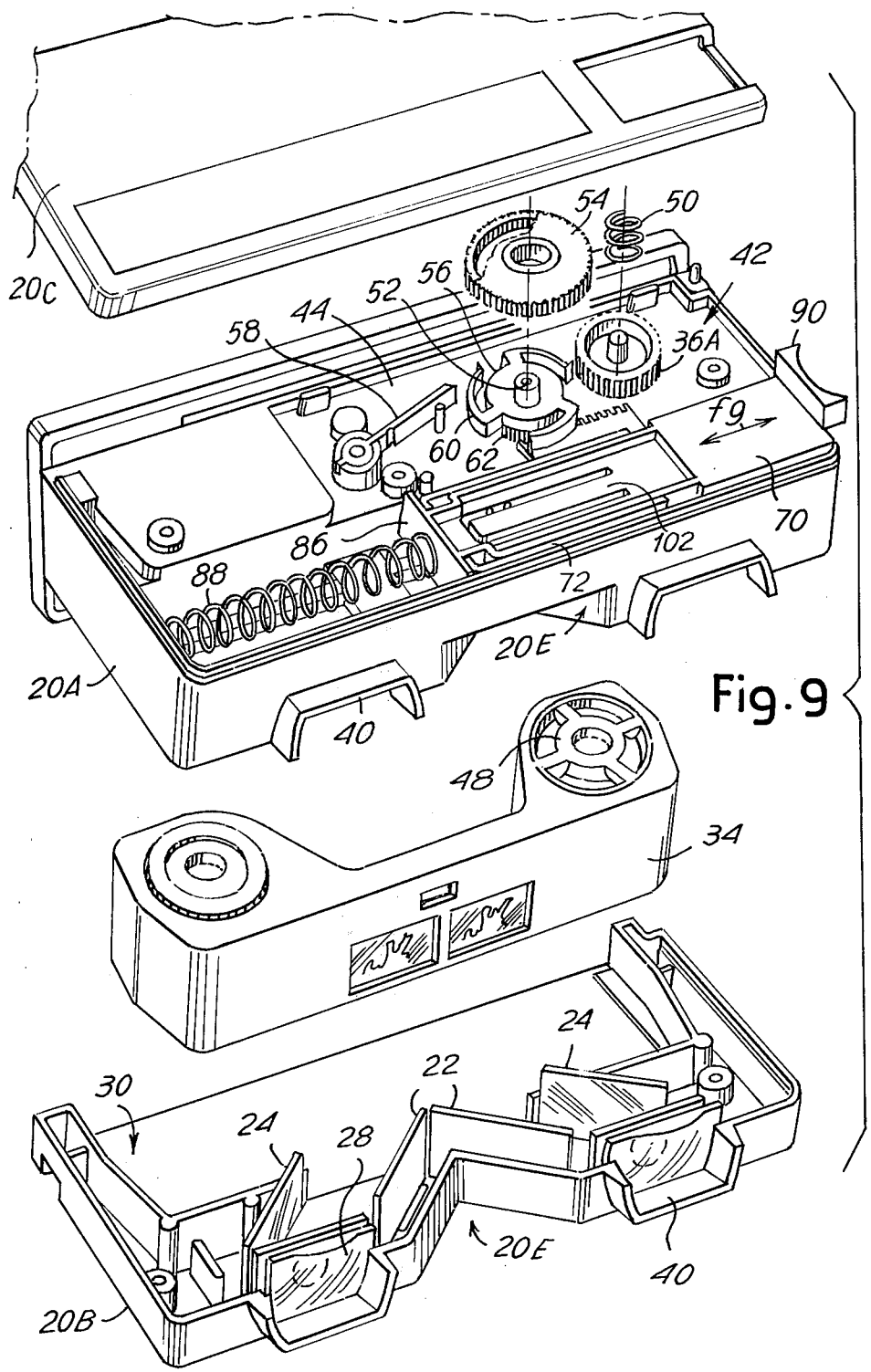
FIG. 9 is an exploded view of the viewer.

FIG. 1 shows a 35 mm photographic film having sprocket holes 1A and 1B running along opposite sides of the film. To use this film in the viewer to be described in more detail with reference to FIG. 5, the film is split longitudinally along its axis 3 into two equal film portions 11; see the right hand side of FIG. 1. Thus each split length of film has one edge 12 adjacent which the perforation 1A or 1B lie and an opposite edge 13 adjacent which there are not perforations. Each film portion 11 is arranged to be exposed two frames at a time to record thereon a stereoscopic image, the frames are recorded on the film side by side in the longitudinal direction of the film. Each frame 14A to 14F is approximately from 11 to 12 mm high, this is in a direction extending perpendicular to the sprocket holes 1A or 1B. The rows of sprocket holes 1A and 1B have an enlarged sprocket hole 16 which occurs regularly at intervals corresponding to twice the width of a frame 14A to 14F. The centre of the enlarged sprocket hole is arranged to be in alignment with the line separating the two frames in each pair of stereoscopically recorded frames 14A and 14B, 14C and 14D, 14E and 14F. The enlarged sprocket hole 16 has a dimension in the longitudinal direction of the film equal to that of two normal sized sprocket holes 1A plus the separation between adjacent sprocket holes. Each elongate sprocket hole 16 can thus be formed by punching out the portion of film separating adjacent normal sized sprocket holes.

In order to correctly locate each pair of stereoscopically recorded frames in the viewer, the viewer is provided with a locating finger 18, having a cross-section which corresponds to that of the enlarged sprocket holes 16. The tip of the locating finger 18 is chamfered along one edge to facilitate engagement of the finger 18 with the holes 16. The locating finger 18 is resiliently biased in the direction of the arrow $f1$ of FIGS. 3 and 5 towards the film. Thus when the film is located in the position shown in FIG. 2 the finger 18 is in engagement with one of the holes 16. When the viewer is then actuated for viewing another pair of frames the finger 18 is displaced in the direction of the arrow $f5$ of FIG. 2 to disengage the hole and the film driven in the direction of the arrow $f3$ of FIGS. 2 to 5. As the film starts to move, the finger 18 is released so that it returns under its bias into engagement with the film. However since it is not in alignment with a hole 16 the film moving in the direction of the arrow $f3$ slides past the finger. When the subsequent hole 16 becomes aligned with the finger 18 the finger moves in the direction of the arrow f1 into engagement with the hole whereupon further displacement of the film is halted. At this point a fresh pair of frames are now located in the viewing position in the viewer.

As shown in FIG. 5 the viewer has a casing 20 housing two pairs of mirrors 22 and 24. In operation light passing through each of the frames in the viewing position is reflected by respective ones of the mirrors 22 and 24 through an aperture to a corresponding lens 28. The two lenses 28 are separated by an inter-pupil distance and constitute the eye pieces through which the two frames can be viewed. The viewer includes a device for retracting and releasing the locating finger 18, and a device for the driving the film in the direction of the arrow f3 when released for movement. The casing 20 has a cartridge housing 30 into which a cartridge 34 can be loaded. Access to the housing 30 can be gained through a hinged cover 32 of the casing 20. A rotary drive member 36 is located in the floor of the housing 20 and is arranged to engage a drive hub of the cartridge 34 for winding the film ON in the cartridge; the drive hub being omitted in FIG. 5 to render the member 36 visible. The cover 32 has a central window formed by a translucent sheet 32A, and through which diffused light can enter to illuminate the film.

It will be readily appreciated that standard 35 mm film can be readily adapted for use in the viewer.

As can be seen more clearly in FIG. 6 each lens 28 is surrounded by a corresponding eye cup 40. The casing 20 is formed in three parts 20B, 20A and 20C which are stacked in the recited order one on top of the other. The part 20B defines a chamber 42 which houses the film drive apparatus. Access to the chamber 42 can be gained by removing the part 20C which acts as a cover. The part 20B of the casing defines a recess between the two eye cups 20E to accommodate the nose of the operator when the film is observed through the eye pieces.

A ceiling 44 separates the cartridge housing 30 from the chamber 42, as shown in FIG. 16 is stepped to provide an enlarged portion of the chamber 42. The wall 44 defines a circular through hole 46 (see FIG. 16) which accommodates the drive member 36 for winding a take-up reel of the cartridge 34. The member 36 has a cylindrical body accommodated in the hole 46 and a series of projections which project axially from the body and engage the hub of the takeup reel 48 of the cartridge 34. The body of the member 36 has a flange 36A defining gear teeth and is biased by a small spring 50 extending between the cover section 200, and the flange 36A to bias the member 36 through the hole 46. Displacement of the member 36 in this direction is limited when the flange 36A abuts the ceiling 44. It will be appreciated that this allows the projections of the member 36 to be retracted into the hole 46 driving the insertion of a cartridge 34 into the housing 30.

A pin 52 rotatably carrying a gear 54 (see FIG. 27) is rigid with the wall 44 (see FIGS. 11 and 12). The pin 52 also carries a ratchet device 56. The gear 54 has an outer set of gear teeth which mesh with the gear teeth of the flange 36A and which is engaged by a resilient pawl 58, fixed to the wall 44 which allows the gear 54 to rotate only in the sense of the arrow f7 but not in the opposite sense. The gear 54 also has an internally directed set of gear teeth 54A, which are engaged by a series of resilient arms 60 of the member 56. The member 56 also has a set of gear teeth 62 which mesh with a rack 80 of a slider 72. When the member 56 is rotated in the sense of the arrow f7, the arms 60 which mesh the inner teeth 54A of the gear wheel 54, cause it to rotate in the sense as that allowed by the pawl 58. When the member 56 is rotated in the opposite sense to the arrow f7, the arms 60 skip from tooth to tooth of the inner teeth 54A and the gear 54 remains locked by the pawl 58. The assembly 54, 56, 60, 62 thus represents a unidirectional freewheel coupling.

Figure 13:
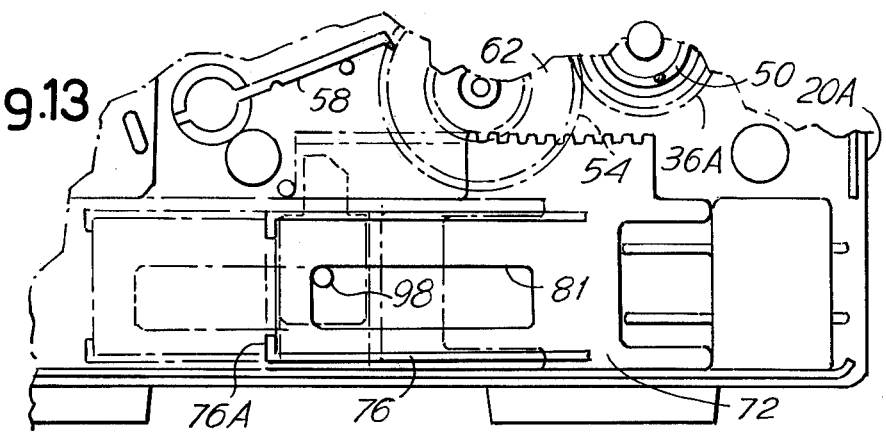
Figure 20:
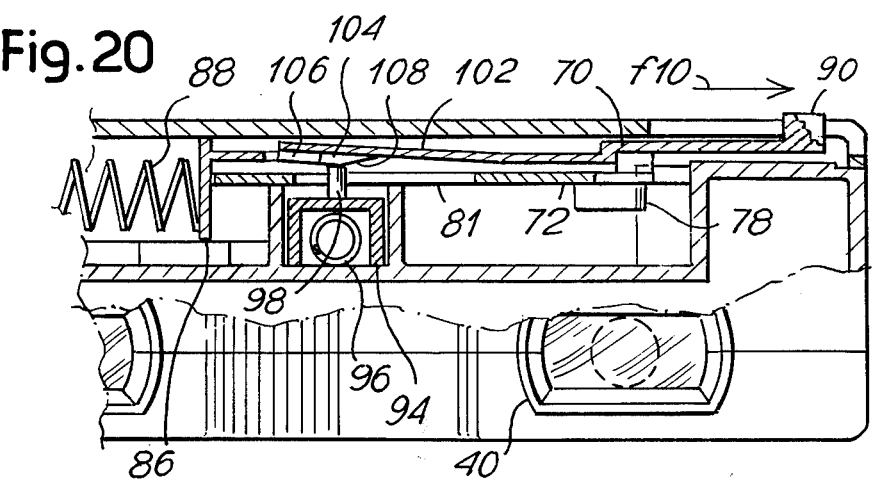
FIG. 20 is a local section taken on the line XX—XX of FIG. 19.
Figure 21:
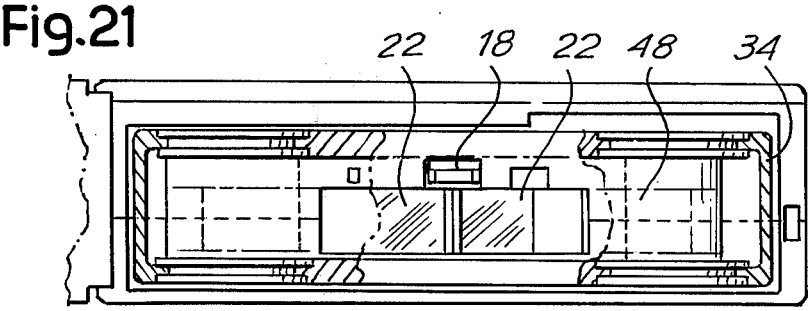
FIG. 21 is a section taken on the line XXI—XXI of FIG. 15.

The viewer includes a manually controlled film displacement system which will now be described. The casing 20 has two sets of guides for two sliders 70, 72 (shown alone in FIGS. 22, 23 and 24, 25), both of which can be displaced in the direction indicated by the double arrows f9. The second slide 72 has a longitudinal guide edge 74, a pair of guide walls 76 each terminating in an end stop 76A, a pair of fins 78, a laterally extending portion defining a rack 80 arranged to mesh with the gear 62 and a central elongate opening 81. The other slide 70 has a pair of guide edges 82 which slidably engage the walls 76 of the slide 72. The guide edges 82 define recesses 84 which are engaged by the stops 76A and thus allow only a limited relative movement between the two sliders 70 and 72. The slider 70 has an end wall 86 which forms a surface against which a spring 88 is made to bear. The spring engages a wall of the casing part 20A, and thus biases the slider 70 in the direction of the arrow f10. At the end opposite to the end wall 86, the slider 70 has a pushbutton shaped portion 90 which projects from the casing 20 (see FIG. 9) and is arranged to be displaced by an operator. The portion 20A of the casing 20 has a pair of walls 92 (see FIG. 17) which extend transversely of the direction f9 in which the sliders 70 and 72 are slidable. The walls 92 slidably entrain a body 94 carrying the aforementioned locating finger 18. The body 94 and the finger 18 are being urged by a spring 96, in the direction of the arrow f12 to cause the finger 18 to pass through an opening in the wall 44 into engagement with the film 11. When the film is positioned so that the hole 16 is aligned with the finger 18 the finger will then engage that hole 16. A pin 98 rigid with the body 94 projects through the window 81 (see FIG. 13) to cooperate with the slider 70. The slider 70 has a U shaped slot 100 (see FIG. 20) which defines a resilient portion 102 in the slider 70 and which is engaged by the pin 98 and is arranged to be displaced by the pin 98 as shown in FIG. 20. As shown in FIG. 20 the resilient portion 102 carries a cam 104, having two ramp surfaces 106 and 108 extending in two planes which are inclined planes with respect to one another.

Figure 14:
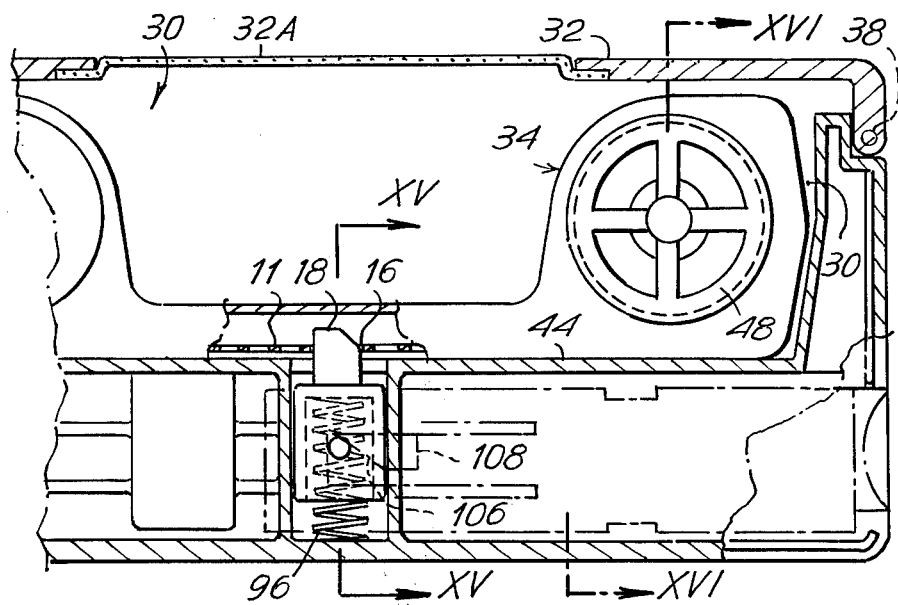
FIG. 14 is a section through the viewer.
Figure 15:
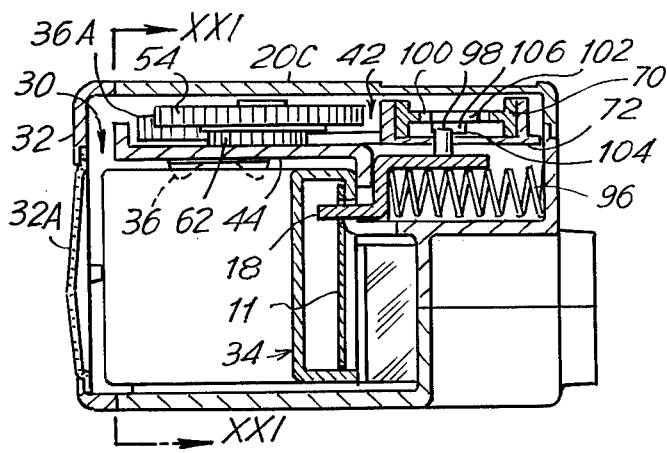

It will be assumed that in an initial state of operation the spring 88 holds the slider 70 against the slider 71 and the slider 72 abuts the casing 20. Also the pin 98 is out of engagement with the cam 104 (FIGS. 12 and 14) and the finger 18 is biased by the spring 96 into engagement with one of the holes 16 of the film 11 (FIG. 14). The stops 76A abut the wall 86 (see FIG. 12). With the viewer in this initial state a stereoscopic image can be observed by looking through the eye pieces of the viewer. To view the next pair of frames of the film the push button 90 is displaced in the direction of the arrow f14 and as a result the first slider 70 performs a forward stroke. During the initial part of the forward stroke the play between the two sliders is taken up. While this play is being taken up, the ramp 106 of the cam 104 engages the pin 98 and displaces the pin to cause the finger 18 to disengage the hole 16, see FIG.

Figure 19:
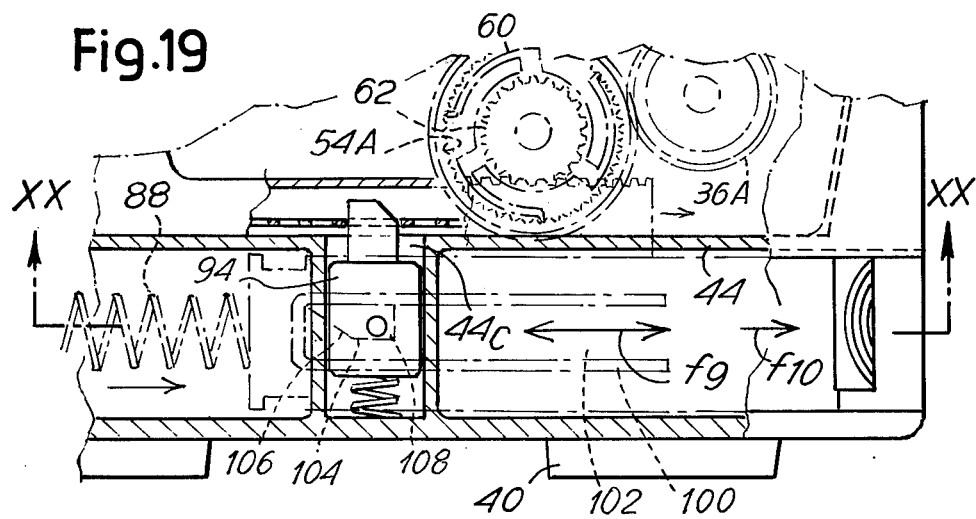

17. At this stage, the pin 98 remains displaced by the cam 104 and the rack 80 meshes with the teeth of the gear 62. As the forward stroke continues the members 62, 56, 54 and 36 are rotated and the film is driven in the direction of the arrow f3. As the film is displaced simultaneously with the displacement of the two sliders 70 and 72, the pin 98 is released from the cam 104 and the finger 18 is biased by the spring 96 back into engagement with the film 11 (see FIG. 18). However since the holes 1A which pass the finger 18 are smaller than the finger 18, the film is not halted. The forward stroke of the slider 70 continues until eventually a hole 16 in the film becomes aligned with finger 18 which then promptly engages the hole 16 (see FIG. 19). At this point the film feed is halted and the pushbutton 90 is locked against further displacement in the direction of the arrow f14. Upon releasing the pushbutton 90, the spring 88 initates a return stroke to return the slider 70 and consequently the slider 72 to their initial positions. During the return stroke the rack 80 causes the member 56 to rotate in the opposite sense to that during the forward stroke, but this time it does not drive the coupling member 54. When the finger 18 engages the hole 16 at the end of the forward stroke the pin 98 was moved in the direction of the arrow f12 from the position shown in FIG. 18 to the position shown in FIG. 19. In the latter position the pin 98 lay adjacent the begining of the inclined surface 108 of the cam so that upon the return stroke the pin 98 engaged the surface 108 to displace the resilient portion 102 which thus allowed the pin 98 to traverse the cam, as shown in FIG. 20. After the pin 98 had traversed the cam just prior to the end of the return stroke, the portion 102 returned under its own resilience to its initial position in which the pin 98 was in a position in which it could again cooperate with the cam surface 106.

It will be appreciated that during the return stroke, the film was not displaced by the movement of the sliders 70 and 72 in the direction of the arrow f10, because the finger 18 and the body 94 under the bias of the spring 96 locked the film in a viewing position thus avoiding any movment of the film which might disturb a good and steady viewing of the film during the return stroke.

I claim:

1. A stereoscopic film viewer for viewing successive pairs of stereoscopic film images on corresponding pairs of frames in a length of film having a locating hole associated with each pair of frames to enable accurate location of the frames in a viewing station by the viewer, the viewer comprising:
    a housing
    drive means located in the housing for driving the film past the viewing station;
    locating means including a finger slidably mounted on the housing;
    biassing means positioned between the locating means and the housing for biassing the finger toward the film for engagement with successive said holes to locate and lock each pair of frames in turn in the viewing station;
    the drive means including a reciprocatable member having a resilient portion carrying a cam; and
    said locating means including a cam follower formed on said finger and arranged to operatively cooperate with a first camming surface of said cam during a forward stroke of the reciprocatable member to displace said finger out of engagement with a locating hole until said drive means has started to drive the film, and to operatively cooperate with a second camming surface of said cam during the return stroke of the reciprocatable member to deflect the said resilient portion of said reciprocatable member and the said cam supported thereby out of an operational posture with respect to said finger.

2. A viewer according to claim 1, wherein said cam is formed with two camming surfaces comprising a first camming surface inclined to a first plane extending normal to the direction of cam movement; and
    a second camming surface inclined to a plane extending parallel to the direction of cam movement.

3. A viewer according to claim 1, wherein the film drive means includes:
    a second reciprocatable member;
    coupling means coupling the second member to the first mentioned reciprocatable member but allowing a predetermined degree of play between the members;
    biassing means located between the housing and the first reciprocatable member to bias the first member to perform the return stroke; and
    a rack formed on the said second reciprocatable member for driving a unidirectional film reel arrangement.

* * * * *